United States Patent
Lee (10) Patent No.: US 9,857,207 B2
(45) Date of Patent: Jan. 2, 2018

(54) APPARATUS FOR MEASURING DISPLACEMENT OF RAILROAD

(71) Applicant: HOSEUNG E&C CO., LTD, Seoul (KR)

(72) Inventor: Keun Ho Lee, Gwangju-si (KR)

(73) Assignee: HOSEUNG E&C CO., LTD, Seoul (KR)

(*) Notice: Subject to any disclaimer, the term of this patent is extended or adjusted under 35 U.S.C. 154(b) by 159 days.

(21) Appl. No.: 14/782,641

(22) PCT Filed: Apr. 15, 2014

(86) PCT No.: PCT/KR2014/003233
§ 371 (c)(1),
(2) Date: Oct. 6, 2015

(87) PCT Pub. No.: WO2014/171695
PCT Pub. Date: Oct. 23, 2014

(65) Prior Publication Data
US 2016/0091347 A1  Mar. 31, 2016

(30) Foreign Application Priority Data

Apr. 15, 2013 (KR) .................. 10-2013-0041013
Apr. 15, 2013 (KR) .................. 10-2013-0041014
(Continued)

(51) Int. Cl.
*G01N 15/00* (2006.01)
*G01D 11/30* (2006.01)
(Continued)

(52) U.S. Cl.
CPC .............. *G01D 11/30* (2013.01); *E01B 35/00* (2013.01); *E01B 35/02* (2013.01); *E01B 35/06* (2013.01); *G01B 21/00* (2013.01); *G01B 21/22* (2013.01)

(58) Field of Classification Search
CPC ......... G01D 11/30; E01B 35/00; E01B 35/02; E01B 35/06
(Continued)

(56) References Cited

U.S. PATENT DOCUMENTS

2004/0182025 A1* 9/2004 Moutsokapas ............ B66C 7/04
52/299

FOREIGN PATENT DOCUMENTS

JP   10-170250    6/1998
JP   2010-223930  10/2010
(Continued)

OTHER PUBLICATIONS

International Search Report for International Application No. PCT/KR2014/003233, dated Aug. 19, 2014.

*Primary Examiner* — John Fitzgerald
*Assistant Examiner* — Rodney T Frank
(74) *Attorney, Agent, or Firm* — Kile Park Reed & Houtteman PLLC (57) ABSTRACT

An apparatus for measuring a displacement of a railroad includes a pair of rail fixing members 100 fixed to enclose a lower part of one rail 10, and installed to be spaced from each other; a lengthwise sensor casing 200a installed between the pair of rail fixing members 100; and an angle sensor installed at the lengthwise sensor casing 200a so as to measure a change of an angle between the pair of rail fixing members 100. With such a configuration, the present invention can be applied to a structure of railroad ties formed of a concrete material. Further, data can be obtained with high reliability, since a displacement of the rail is directly measured.

11 Claims, 11 Drawing Sheets

(30) Foreign Application Priority Data

Sep. 13, 2013 (KR) .......................... 10-2013-0110416
Sep. 13, 2013 (KR) .......................... 10-2013-0110417

(51) Int. Cl.
  *G01B 21/22* (2006.01)
  *E01B 35/00* (2006.01)
  *E01B 35/06* (2006.01)
  *G01B 21/00* (2006.01)
  *E01B 35/02* (2006.01)

(58) Field of Classification Search
  USPC ........................................................ 73/866.5
  See application file for complete search history.

(56) References Cited

FOREIGN PATENT DOCUMENTS

| | | |
|---|---|---|
| KR | 10-0213744 | 8/1999 |
| KR | 20-0432490 | 12/2006 |
| KR | 10-2010-0088945 | 8/2010 |

\* cited by examiner

APPARATUS FOR MEASURING DISPLACEMENT OF RAILROAD

TECHNICAL FIELD

The present invention relates to a construction field, and more particularly, to an apparatus for measuring a displacement of a railroad.

BACKGROUND ART

Figure 1:
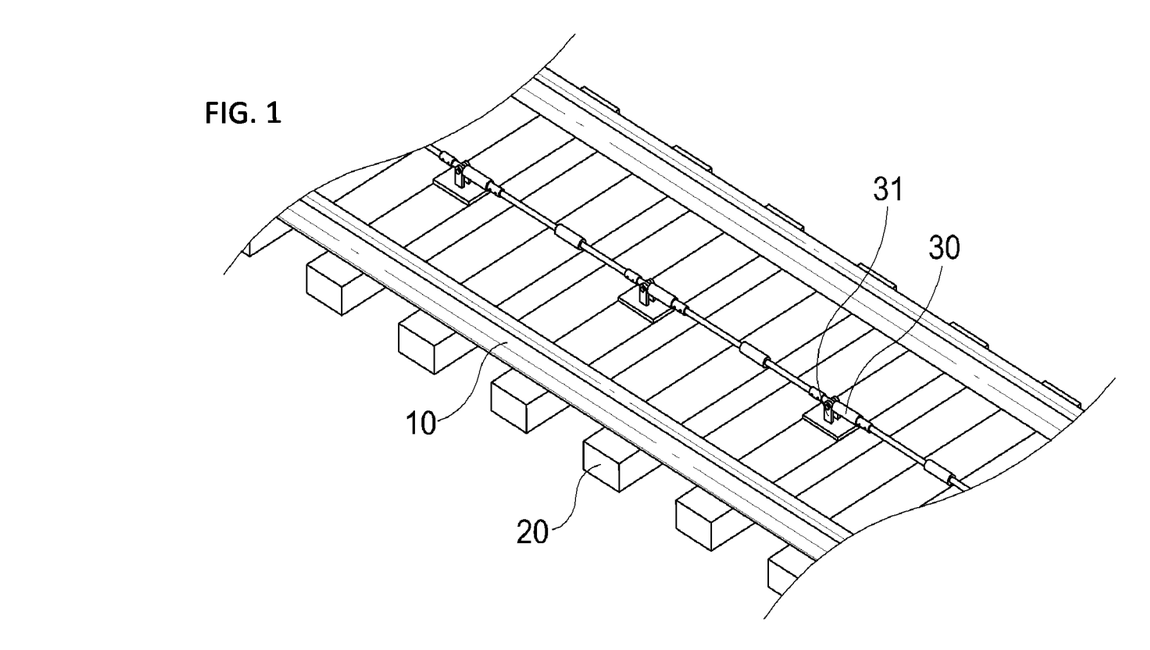
FIG. 1 is a perspective view of an apparatus for measuring a displacement of a railroad in accordance with the conventional art.

Generally, a railroad has a configuration where a plurality of railroad ties 20 are installed in a widthwise direction on a ballast bed, and a pair of rails 10 are installed on the railroad ties 20 (refer to FIG. 1).

If a displacement of the rails 10 occurs due to a land subsidence, the displacement of the rails 10 should be continuously measured, since derailment, etc. may occur.

In the conventional art, supports 31 are installed at the railroad ties 20 formed of a wooden material, at predetermined intervals. And sensors 30 are installed on the supports 31 to measure a displacement of the rails 10.

But the conventional method may have the following problems.

Firstly, in the past, the supports 31 can be fixed to the railroad ties 20 by an anchor, etc., since the railroad ties 20 are formed of a wooden material. On the contrary, recently, it is impossible to install sensors, since railroad ties are formed of a concrete material.

Secondly, a displacement of the rails 10 is not directly measured, but is indirectly measured through measurement of a displacement of the railroad ties 20. This may lower reliability on measured data.

DISCLOSURE OF THE INVENTION

Therefore, an object of the present invention is to provide an apparatus for measuring a displacement of a railroad capable of being applied to a structure of a railroad tie formed of a concrete material, and capable of enhancing reliability on data by directly measuring a displacement of a rail, and a displacement measuring method using the same.

To achieve these and other advantages and in accordance with the purpose of the present invention, as embodied and broadly described herein, there is provided an apparatus for measuring a displacement of a railroad, including: a pair of rail fixing members 100 fixed to enclose a lower part of one rail 10, and installed to be spaced from each other; a lengthwise sensor casing 200a installed between the pair of rail fixing members 100; and an angle sensor installed at the lengthwise sensor casing 200a so as to measure a change of an angle between the pair of rail fixing members 100.

Preferably, lengthwise hinge coupling portions 101a may be formed at the pair of rail fixing members 100. Preferably, two ends of the lengthwise sensor casing 200a may be hinge-coupled to the lengthwise hinge coupling portions 101a of the pair of rail fixing members 100, so as to be hinge-driven in correspondence to subsidence of the one rail 10.

Preferably, the rail fixing members 100 may include: an outer supporting member 110 configured to support a bottom surface and an outer side of a lower flange 11 of the rail 10 in a covering manner; and an inner supporting member 120 coupled to the outer supporting member 110, and configured to support an inner side of the lower flange 11 of the rail 10 in a covering manner. Preferably, the lengthwise hinge coupling portion 101a may be formed at the inner supporting member 120.

Preferably, the outer supporting member 110 may include: a bottom surface supporting portion 111 configured to support a bottom surface of the rail 10 in a contacting manner; and an outer supporting portion 112 upward-extending from an outer side of the bottom surface supporting portion 111, and configured to support an outer side of the lower flange 11 of the rail 10 in a covering manner.

Preferably, the outer supporting member 110 may further include a bent portion 113 downward-bent at front and rear sides of the bottom surface supporting portion 111.

Preferably, the inner supporting member 120 may include: a body portion 121 coupled to the bottom surface supporting portion 111; and a stepped portion 122 formed at the body portion 121 so as to support an inner side of the lower flange 11 of the rail 10 in a covering manner.

Preferably, coupling holes 131 may be formed at the bottom surface supporting portion 111 and the body portion 121 in upper and lower directions, and the outer supporting member 110 and the inner supporting member 120 may be coupled to each other by coupling members 130 coupled to the coupling holes 131.

Preferably, an upward extension portion 123 having a stepped structure may be outward extending from an upper part of the body portion 121, and the lengthwise hinge coupling portion 101a may be formed at the upward extension portion 123.

Preferably, the lengthwise sensor casing 200a may include: a lengthwise sensor body 210a having an angle sensor therein; and a lengthwise sensor coupling portion 220a outward-extending from two sides of the lengthwise sensor body 210a, and hinge-coupled to the lengthwise hinge coupling portion 101a.

Preferably, the lengthwise sensor body 210a may have a cylindrical structure.

Preferably, coupling holes 231 may be formed at the lengthwise hinge coupling portion 101a and the lengthwise sensor coupling portion 220a. And the lengthwise hinge coupling portion 101a and the lengthwise sensor coupling portion 220a may be coupled to each other by coupling members 230 coupled to the coupling holes 231.

Preferably, the apparatus for measuring a displacement of a railroad may further include: another rail fixing members 100a fixed to enclose a lower part of another rail 11; a widthwise sensor casing 200b installed between the rail fixing members 100a of the one rail 10 and the another rail fixing members 100a of the another rail 11; and an angle sensor installed at the widthwise sensor casing 200b so as to measure a change of an angle between the rail fixing members 100 and the another rail fixing members 100a.

Preferably, widthwise hinge coupling portions 101b may be formed at the rail fixing members 100 and the another rail fixing members 100a. Preferably, two ends of the widthwise sensor casing 200b may be hinge-coupled to the widthwise hinge coupling portions 101b of the rail fixing members 100 and the another rail fixing members 100a, so as to be hinge-driven in correspondence to subsidence of the one rail 10 and the another rail 11.

Preferably, the rail fixing members 100 may include: an outer supporting member 110 configured to support a bottom surface and an outer side of a lower flange 11 of the rail 10 in a covering manner; and an inner supporting member 120 coupled to the outer supporting member 110, and configured to support an inner side of the lower flange 11 of the rail 10 in a covering manner. Preferably, the widthwise hinge coupling portion 101b may be formed at the inner supporting member 120.

Preferably, the outer supporting member 110 may include: a bottom surface supporting portion 111 configured to support a bottom surface of the rail 10 in a contacting manner; and an outer supporting portion 112 upward-extending from an outer side of the bottom surface supporting portion 111, and configured to support an outer side of the lower flange 11 of the rail 10 in a covering manner. Preferably, the inner supporting member 120 may include: a body portion 121 coupled to the bottom surface supporting portion 111; and a stepped portion 122 formed at the body portion 121 so as to support an inner side of the lower flange 11 of the rail 10 in a covering manner. Preferably, the widthwise hinge coupling portion 101b may be formed at the body portion 121.

Preferably, the widthwise sensor casing 200b may include: a widthwise sensor body 210b having an angle sensor therein; and a widthwise sensor coupling portion 220b outward-extending from two sides of the widthwise sensor body 210b, and hinge-coupled to the widthwise hinge coupling portion 101b.

Preferably, the widthwise sensor body 210b may have a cylindrical structure.

Preferably, coupling holes 231 may be formed at the widthwise hinge coupling portion 101b and the widthwise sensor coupling portion 220b. And the widthwise hinge coupling portion 101b and the widthwise sensor coupling portion 220b may be coupled to each other by coupling members 230 coupled to the coupling holes 231.

To achieve these and other advantages and in accordance with the purpose of the present invention, as embodied and broadly described herein, there is also provided a method for measuring a displacement of a railroad using the apparatus for measuring a displacement of a railroad, the method including: removing gravels disposed below the one rail 10, and installing the pair of rail fixing members 100 with an interval therebetween; hinge-coupling two ends of the lengthwise sensor casing 200a to the pair of rail fixing members 100, respectively; measuring a change of an angle between the pair of rail fixing members 100 by the angle sensor, thereby measuring a displacement of the one rail 10.

According to another aspect of the present invention, there is also provided a method for measuring a displacement of a railroad, using the apparatus for measuring a displacement of a railroad, the method including: removing gravels disposed below the one rail 10 and the another rail 11, and installing the pair of rail fixing members 100 and the another rail fixing members 100a, respectively; hinge-coupling two ends of the widthwise sensor casing 200b to the pair of rail fixing members 100 and the another rail fixing members 100a, respectively; measuring a change of an angle between the pair of rail fixing members 100 and the another rail fixing members 100a by the angle sensor, thereby measuring a relative displacement of the one rail 10 and the another rail 11.

Advantageous Effects

The apparatus and method for measuring a displacement of a railroad can be applied to a structure of railroad ties formed of a concrete material, and can enhance reliability on data by directly measuring a displacement of a rail.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of an apparatus for measuring a displacement of a railroad according to embodiments, with reference to the accompanying drawings.

As shown in FIGS. 2 to 11, the apparatus for measuring a displacement of a railroad according to the present invention includes a pair of rail fixing members 100 fixed to enclose a lower part of one rail 10, and installed to be spaced from each other; a sensor casing 200 installed between the pair of rail fixing members 100; and an angle sensor installed at the sensor casing 200 so as to measure a change of an angle between the pair of rail fixing members 100.

Figure 2:
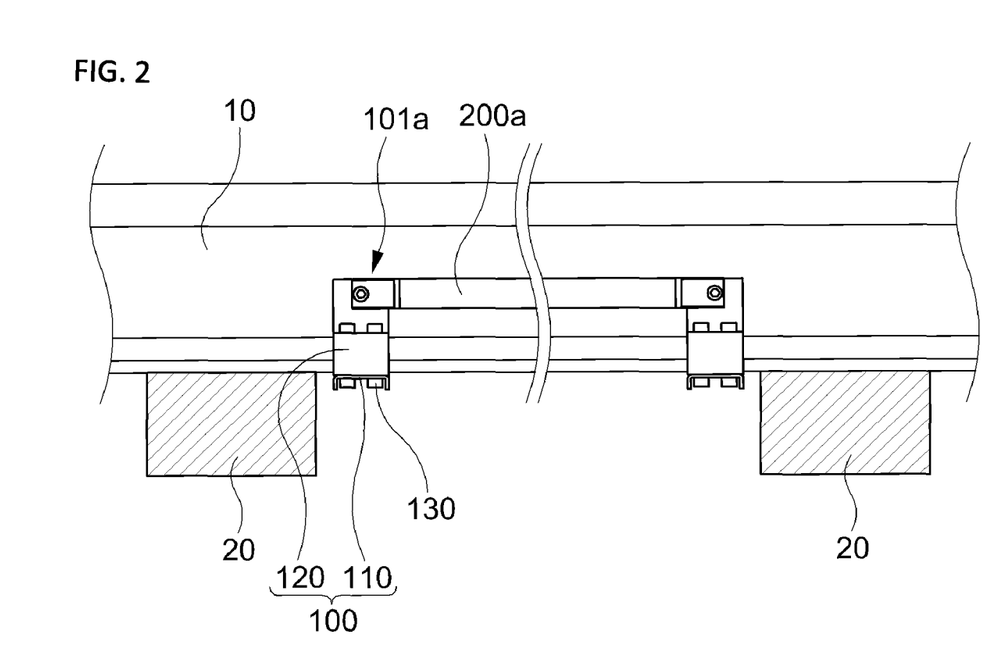
FIG. 2 is a side sectional view of an apparatus for measuring a displacement of a railroad according to a first embodiment of the present invention.
Figure 3:
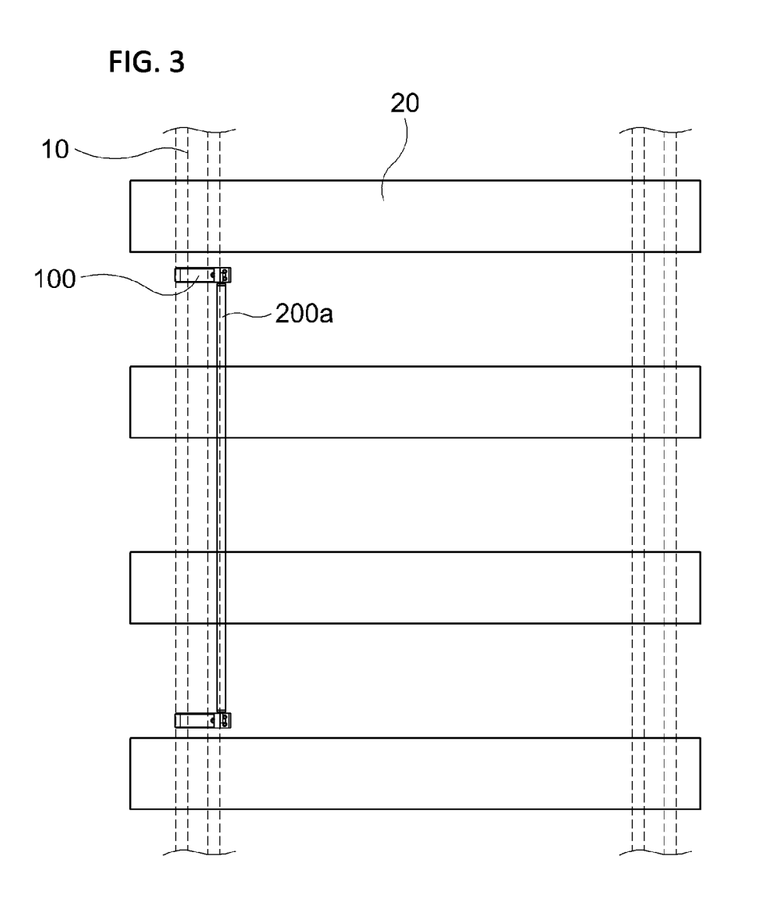
FIG. 3 is a planar view of the apparatus for measuring a displacement of a railroad according to a first embodiment of the present invention.

That is, the pair of rail fixing members 100 are fixed to enclose a lower part of one rail 10, and are installed to be spaced from each other. The sensor casing 200 is installed between the pair of rail fixing members 100, and an angle change (a height change) of the one rail 10 in a moving direction is measured by the angle sensor installed at the sensor casing 200.

The configuration has the following effects.

Firstly, since the apparatus is directly installed on the rails regardless of a material of railroad ties, there is no problem in installation even if railroad ties formed of a concrete material are used.

Secondly, reliability on measured data is enhanced, because a displacement of the rail 10 is directly measured unlike in the conventional art.

Lengthwise hinge coupling portions 101a are formed at the pair of rail fixing members 100. And a lengthwise sensor casing 200a may have a structure where two ends thereof are hinge-coupled to the lengthwise hinge coupling portions 101a of the pair of rail fixing members 100, so as to be hinge-driven in correspondence to subsidence of the one rail 10.

In this case, since the lengthwise sensor casing 200a is hinge-coupled between the pair of rail fixing members 100, the lengthwise sensor casing 200a is stably hinge-driven when a displacement of the rail 10 occurs (i.e., one side of the rail becomes higher and another side of the rail becomes lower). As a result, the displacement of the rail 10 may be measured stably and precisely without damage of the sensor.

The rail fixing members 100 may have any structure to be fixed with enclosing a lower part of the rail 10. The rail fixing members 100 include an outer supporting member 110 configured to support a bottom surface and an outer side of a lower flange 11 of the rail 10 in a covering manner; and an inner supporting member 120 coupled to the outer supporting member 110, and configured to support an inner side of the lower flange 11 of the rail 10 in a covering manner. If the lengthwise hinge coupling portion 101a is formed at the inner supporting member 120, a stable supporting structure to enclose a lower part of the rail 10 may be implemented (refer to FIGS. 4 to 6).

Figure 5:
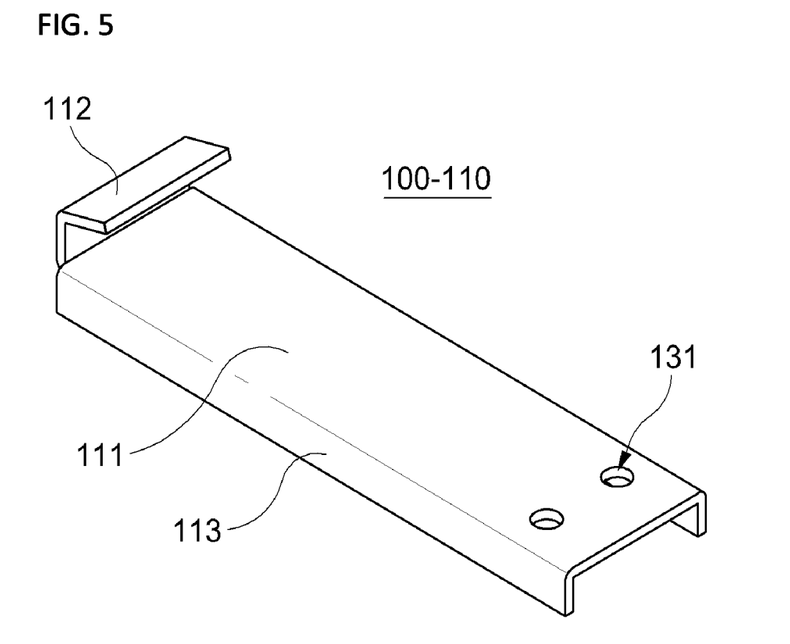
FIG. 5 is a perspective view of an outer supporting member according to the present invention.

The outer supporting member 110 includes a bottom surface supporting portion 111 configured to support a bottom surface of the rail 10 in a contacting manner; and an outer supporting portion 112 upward-extending from an outer side of the bottom surface supporting portion 111, and configured to support an outer side of the lower flange 11 of the rail 10 in a covering manner. Such a configuration is preferable in the aspect of a structural stability, because the lower flange 11 of the rail 10 may be enclosed more stably.

In a case where a bent portion 113 is downward formed at front and rear sides of the bottom surface supporting portion 111, an effect to prevent damage of the bottom surface supporting portion 111 due to a load in upper and lower directions, may be added.

Figure 6:
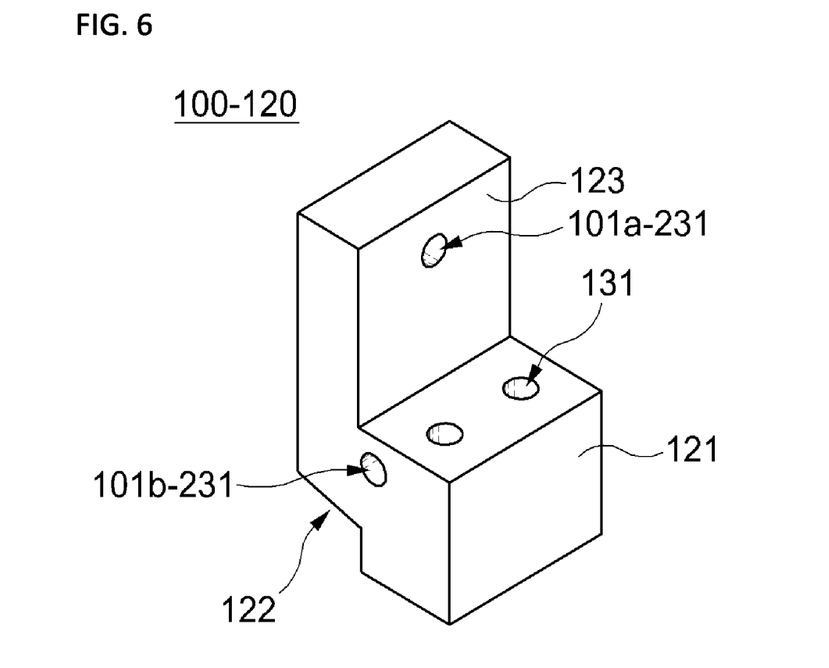
FIG. 6 is a perspective view of an inner supporting member according to the present invention.

The inner supporting member 120 includes a body portion 121 coupled to the bottom surface supporting portion 111; and a stepped portion 122 formed at the body portion 121 so as to support an inner side of the lower flange 11 of the rail 10 in a covering manner. Such a configuration is preferable in the aspect of a structural stability, because the lower flange 11 of the rail 10 may be enclosed more stably.

Figure 4:
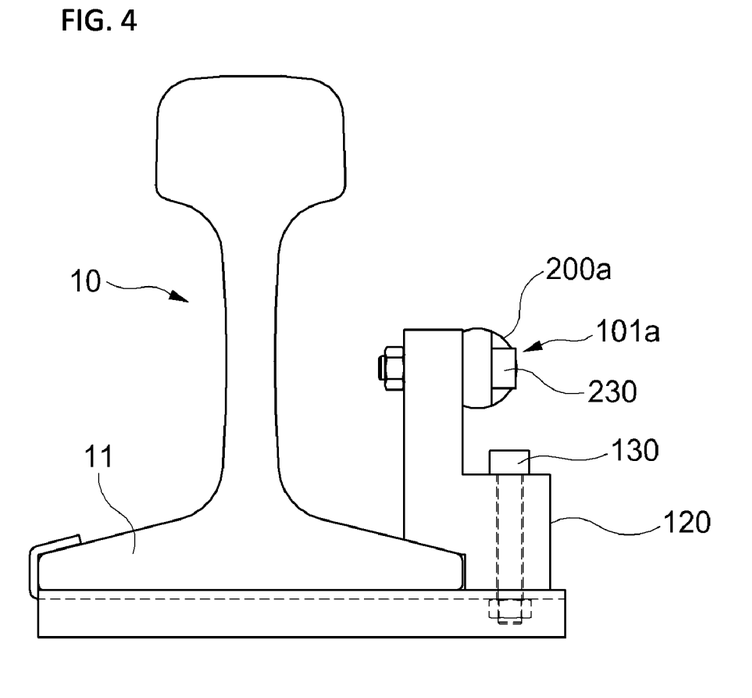
FIG. 4 is a sectional view of the apparatus for measuring a displacement of a railroad according to a first embodiment of the present invention.

Coupling holes 131 are formed at the bottom surface supporting portion 111 and the body portion 121 in upper and lower directions, and the outer supporting member 110 and the inner supporting member 120 are coupled to each other by coupling members 130 (e.g., bolts and nuts) coupled to the coupling holes 131. Such a configuration is preferable in the aspect of a structural stability, because the inside of the lower flange 11 of the rail 10 is fixed in a pressed state in upper and lower directions.

An upward extension portion 123 having a stepped structure is outward extending from an upper part of the body portion 121, and the lengthwise hinge coupling portion 101a is formed at the upward extension portion 123. In this case, there is an additional advantage that the lengthwise sensor casing 200a is stably hinge-driven without contacting the coupling holes 131 or the coupling members 130.

Figure 7:
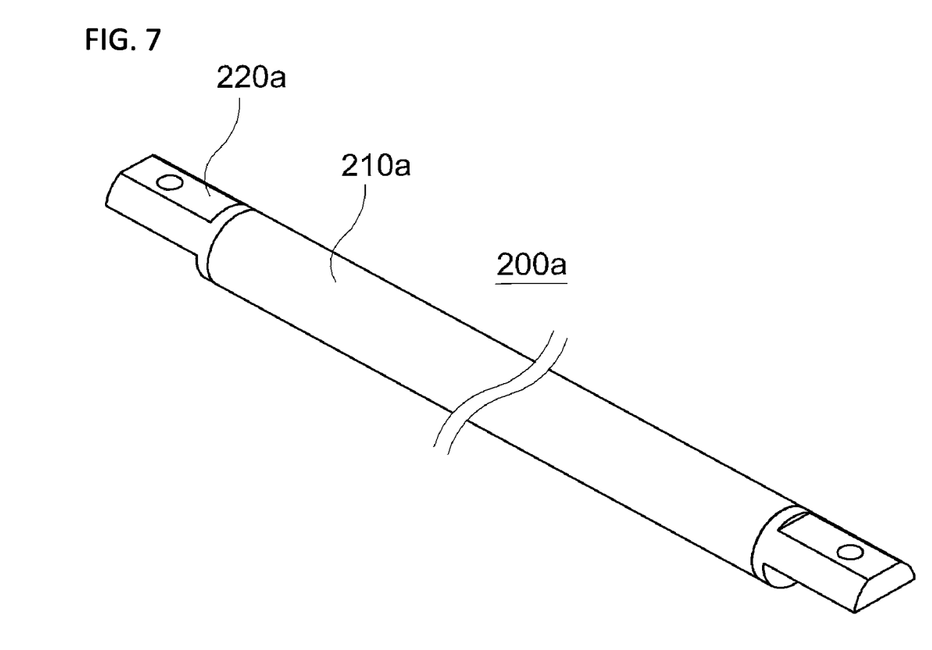
FIG. 7 is a perspective view of a lengthwise sensor casing.

For stable measurement, the lengthwise sensor casing 200a preferably includes a lengthwise sensor body 210a having an angle sensor therein; and a lengthwise sensor coupling portion 220a outward-extending from two sides of the lengthwise sensor body 210a, and hinge-coupled to the lengthwise hinge coupling portion 101a (refer to FIG. 7).

While a train is running, gravels (pebbles) may be blown to collide with the lengthwise sensor casing 200a. This may cause a problem that a displacement of the rails is not stably measured. Such a problem may be minimized, if the lengthwise sensor body 210a of the lengthwise sensor casing 200a has a cylindrical structure.

Coupling holes 231 are formed at the lengthwise hinge coupling portion 101a and the lengthwise sensor coupling portion 220a. And the lengthwise hinge coupling portion 101a and the lengthwise sensor coupling portion 220a are coupled to each other by coupling members 230 (e.g., bolts and nuts) coupled to the coupling holes 231. In this case, there is an additional advantage that a stable coupling structure and a stable hinge driving structure are implemented.

The apparatus for measuring a displacement of a railroad may further include another rail fixing members 100a fixed to enclose a lower part of another rail 11 opposite to the one rail 10; a widthwise sensor casing 200b installed between the rail fixing members 100a of the one rail 10 and the another rail fixing members 100a of the another rail 11; and an angle sensor installed at the widthwise sensor casing 200b so as to measure a change of an angle between the rail fixing members 100 and the another rail fixing members 100a. With such a configuration, an angle change (or a height change) between the two rails 10, 11 may be measured (refer to FIGS. 8 and 9).

That is, in the present invention, a displacement of the rails in a widthwise direction (a height difference between the two rails), which has not been measured in the conventional art, is measured. This can implement a safe driving of a train.

Figure 8:
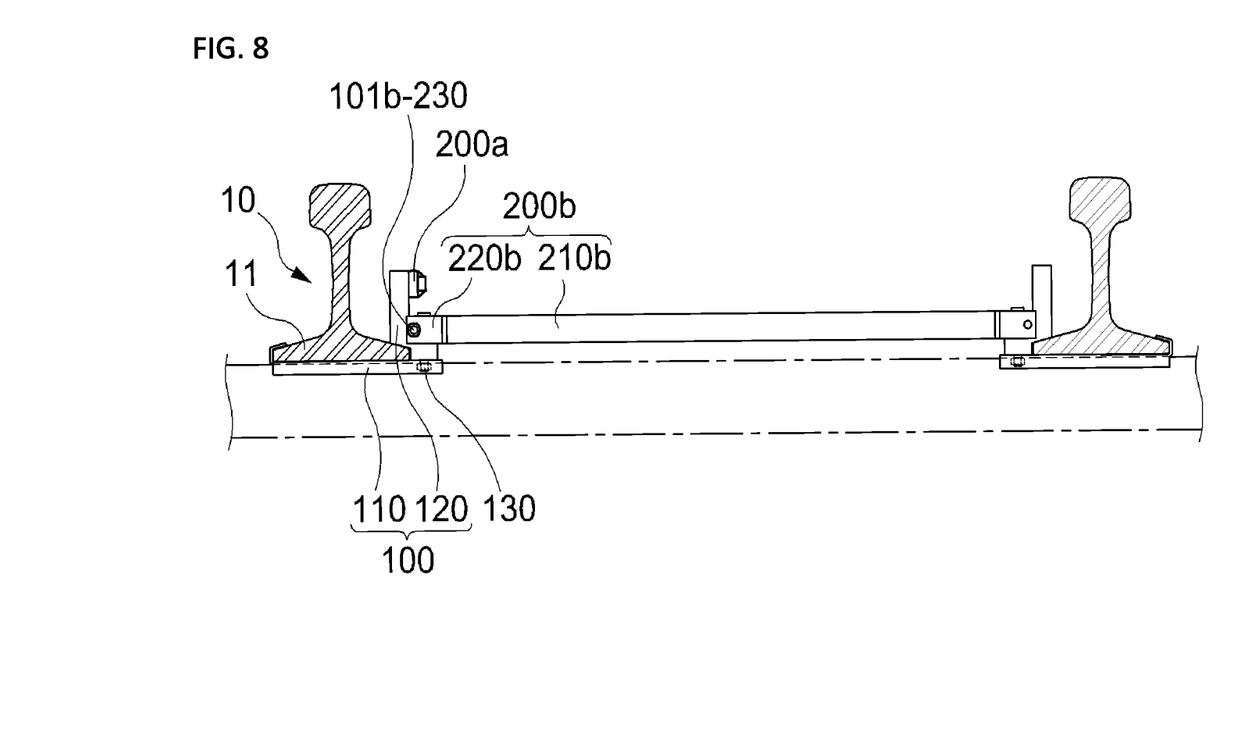
FIG. 8 is a side sectional view of an apparatus for measuring a displacement of a railroad according to a second embodiment of the present invention.
Figure 9:
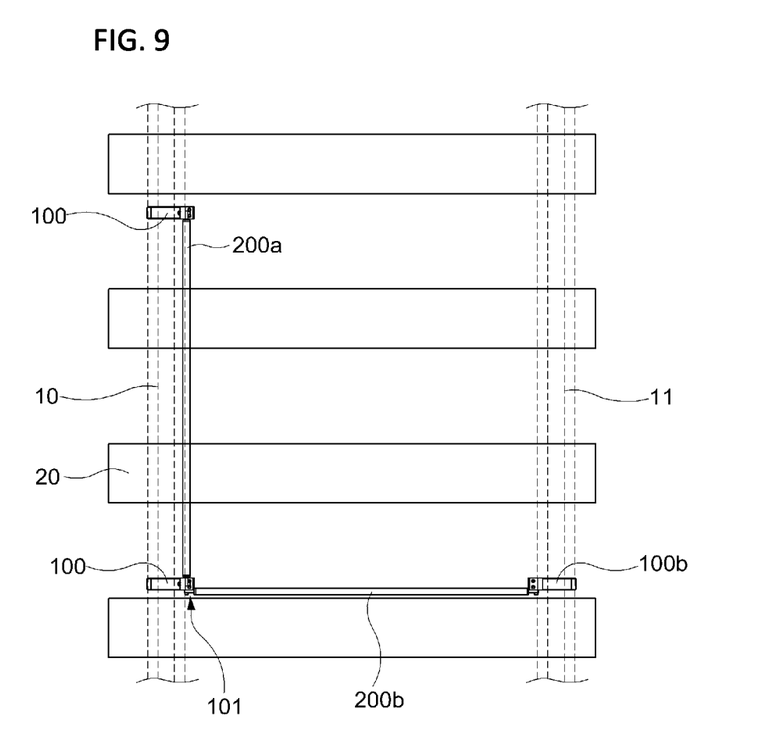
FIG. 9 is a planar view of the apparatus for measuring a displacement of a railroad according to a second embodiment of the present invention.

Widthwise hinge coupling portions 101b are formed at the rail fixing members 100 and the another rail fixing members 100a. And a widthwise sensor casing 200b may have a structure where two ends thereof are hinge-coupled to the widthwise hinge coupling portions 101b of the rail fixing members 100 and the another rail fixing members 100a, so as to be hinge-driven in correspondence to subsidence of the one rail 10 and the another rail 11.

In this case, since the widthwise sensor casing 200b is hinge-coupled between the pair of rail fixing members 100, the widthwise sensor casing 200b is stably hinge-driven when a relative displacement of the rails 10, 11 occurs. As a result, the displacement of the rails may be measured stably and precisely without damage of the sensor.

The rail fixing members 100 and the another rail fixing members 100a have only to have the same structure.

Figure 10:
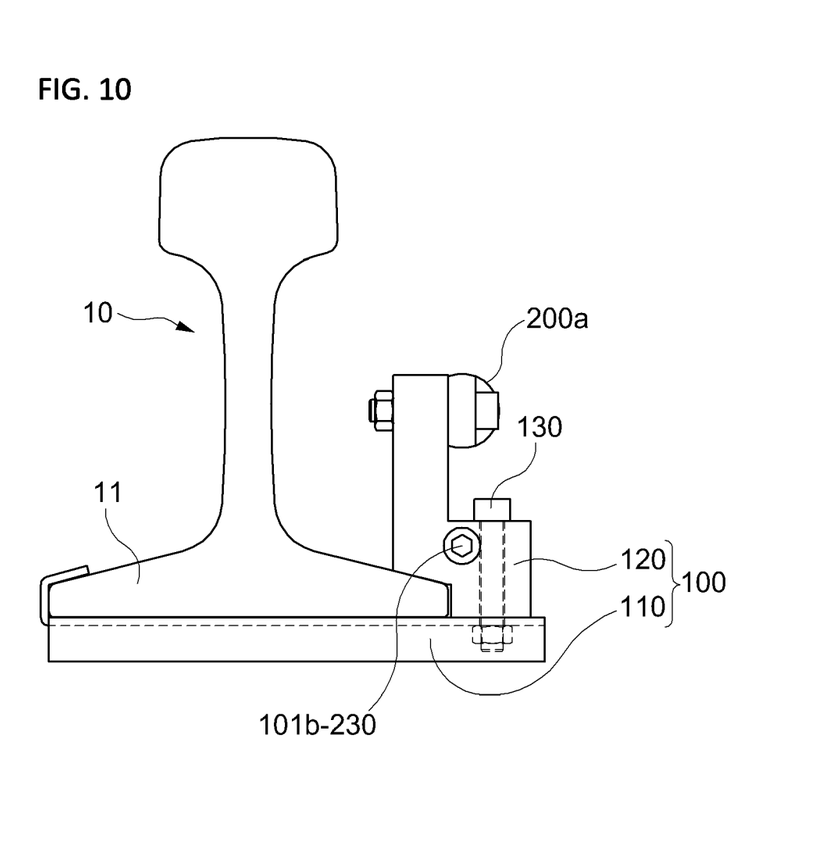
FIG. 10 is a sectional view of the apparatus for measuring a displacement of a railroad according to a second embodiment of the present invention.

For prevention of contact to the sensor casings 200a, 200b, it is preferable to form the lengthwise hinge coupling portion 101a at the upward extension portion 123 of the inner supporting member 120 of the rail fixing members 100, and to form the widthwise hinge coupling portion 101b at the body portion 121 of the inner supporting member 120 (refer to FIGS. 6 and 10).

Figure 11:
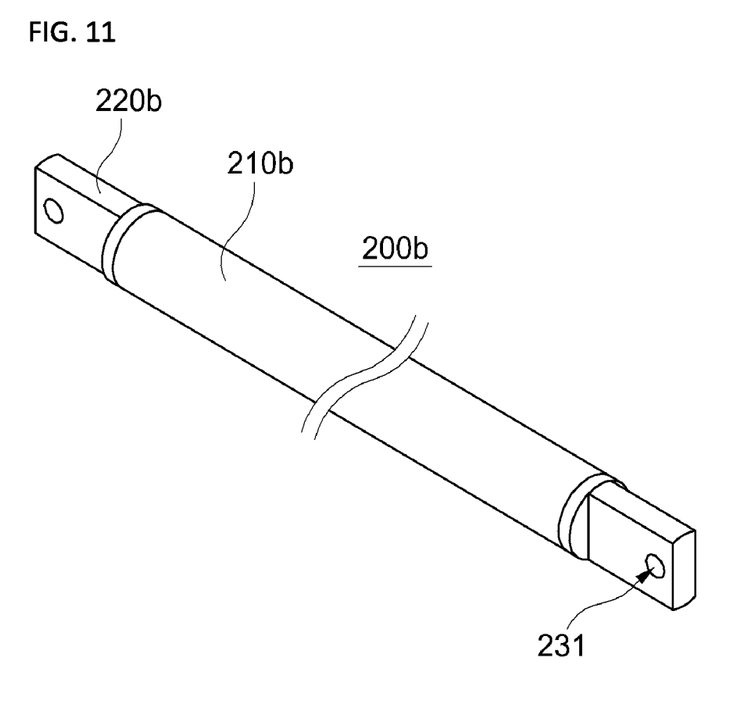
FIG. 11 is a perspective view of a sensor casing in a widthwise direction.

For stable measurement, like the lengthwise sensor casing 200a, the widthwise sensor casing 200b preferably includes a widthwise sensor body 210b having an angle sensor therein; and a widthwise sensor coupling portion 220b outward-extending from two sides of the widthwise sensor body 210b, and hinge-coupled to the widthwise hinge coupling portion 101b (refer to FIG. 11).

While a train is running, gravels (pebbles) may be blown to collide with the widthwise sensor casing 200b. This may cause a problem that a displacement of the rails is not stably measured. Such a problem may be solved if the widthwise sensor body 210*b* of the widthwise sensor casing 200*b* has a cylindrical structure.

Coupling holes 231 are formed at the widthwise hinge coupling portion 101*b* and the widthwise sensor coupling portion 220*b*. And the widthwise hinge coupling portion 101*b* and the widthwise sensor coupling portion 220*b* are coupled to each other by coupling members 230 (e.g., bolts and nuts) coupled to the coupling holes 231. In this case, there is an additional advantage that a stable coupling structure and a stable hinge driving structure are implemented.

Hereinafter, a method for measuring a displacement of a railroad using the apparatus for measuring a displacement of a railroad will be explained.

Firstly, gravels (pebbles) disposed below the one rail 10 are removed, and the pair of rail fixing members 100 are installed with an interval therebetween so as to enclose a lower part of the one rail 10. Then, the gravels are restored to the original state.

Two ends of the lengthwise sensor casing 200*a* are hinge-coupled to the pair of rail fixing members 100, respectively.

An angle change between the pair of rail fixing members 100 is measured by the angle sensor installed at the lengthwise sensor casing 200*a*, thereby measuring a displacement of the one rail 10.

For measurement of a widthwise displacement of the two rails 10, 11, the following steps are added.

Firstly, gravels (pebbles) disposed below the two rails 10, 11 are removed, and the pair of rail fixing members 100 are installed so as to enclose a lower part of the two rails 10, 11. Then, the gravels are restored to the original state.

Two ends of the widthwise sensor casing 200*b* are hinge-coupled to the pair of rail fixing members 100, respectively.

An angle change between the pair of rail fixing members 100 is measured by the angle sensor installed at the widthwise sensor casing 200*b*, thereby measuring a displacement of the two rails 10, 11.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. An apparatus for measuring a displacement of a railroad, comprising:
   a pair of rail fixing members 100 fixed to enclose a lower part of one rail 10, and installed to be spaced from each other;
   a lengthwise sensor casing 200*a* installed between the pair of rail fixing members 100; and
   an angle sensor installed at the lengthwise sensor casing 200*a* so as to measure a change of an angle between the pair of rail fixing members 100,
   wherein lengthwise hinge coupling portions 101*a* are formed at the pair of rail fixing members 100, and
   wherein two ends of the lengthwise sensor casing 200*a* are hinge-coupled to the lengthwise hinge coupling portions 101*a* of the pair of rail fixing members 100, so as to be hinge-driven in correspondence to subsidence of the one rail 10.

2. The apparatus of claim 1, wherein the rail fixing members 100 include:
   an outer supporting member 110 configured to support a bottom surface and an outer side of a lower flange 11 of the rail 10 in a covering manner; and
   an inner supporting member 120 coupled to the outer supporting member 110, and configured to support an inner side of the lower flange 11 of the rail 10 in a covering manner, and
   wherein the lengthwise hinge coupling portion 101*a* is formed at the inner supporting member 120.

3. The apparatus of claim 2, wherein the outer supporting member 110 includes:
   a bottom surface supporting portion 111 configured to support a bottom surface of the rail 10 in a contacting manner; and
   an outer supporting portion 112 upward-extending from an outer side of the bottom surface supporting portion 111, and configured to support an outer side of the lower flange 11 of the rail 10 in a covering manner.

4. The apparatus of claim 3, wherein the outer supporting member 110 further includes a bent portion 113 downward-bent at front and rear sides of the bottom surface supporting portion 111.

5. The apparatus of claim 3, wherein the inner supporting member 120 includes:
   a body portion 121 coupled to the bottom surface supporting portion 111; and
   a stepped portion 122 formed at the body portion 121 so as to support an inner side of the lower flange 11 of the rail 10 in a covering manner.

6. The apparatus of claim 5, wherein coupling holes 131 are formed at the bottom surface supporting portion 111 and the body portion 121 in upper and lower directions, and
   wherein the outer supporting member 110 and the inner supporting member 120 are coupled to each other by coupling members 130 coupled to the coupling holes 131.

7. The apparatus of claim 5, wherein an upward extension portion 123 having a stepped structure is outward extending from an upper part of the body portion 121, and
   wherein the lengthwise hinge coupling portion 101*a* is formed at the upward extension portion 123.

8. The apparatus of claim 1, further comprising:
   another rail fixing members 100*a* fixed to enclose a lower part of another rail 11;
   a widthwise sensor casing 200*b* installed between the rail fixing members 100*a* of the one rail 10 and the another rail fixing members 100*a* of the another rail 11; and
   an angle sensor installed at the widthwise sensor casing 200*b* so as to measure a change of an angle between the rail fixing members 100 and the another rail fixing members 100*a*.

9. The apparatus of claim 8, wherein widthwise hinge coupling portions 101*b* are formed at the rail fixing members 100 and the another rail fixing members 100*a*, and
   wherein two ends of the widthwise sensor casing 200*b* are hinge-coupled to the widthwise hinge coupling portions 101*b* of the rail fixing members 100 and the another rail fixing members 100*a*, so as to be hinge-driven in correspondence to subsidence of the one rail 10 and the another rail 11.

10. The apparatus of claim 9, wherein the rail fixing members 100 include:
    an outer supporting member 110 configured to support a bottom surface and an outer side of a lower flange 11 of the rail 10 in a covering manner; and an inner supporting member 120 coupled to the outer supporting member 110, and configured to support an inner side of the lower flange 11 of the rail 10 in a covering manner, and wherein the lengthwise hinge coupling portion 101*a* is formed at the inner supporting member 120.

11. The apparatus of claim 10, wherein the outer supporting member 110 includes:

a bottom surface supporting portion 111 configured to support a bottom surface of the rail 10 in a contacting manner; and an outer supporting portion 112 upward-extending from an outer side of the bottom surface supporting portion 111, and configured to support an outer side of the lower flange 11 of the rail 10 in a covering manner, wherein the inner supporting member 120 includes:

a body portion 121 coupled to the bottom surface supporting portion 111; and a stepped portion 122 formed at the body portion 121 so as to support an inner side of the lower flange 11 of the rail 10 in a covering manner, and wherein the widthwise hinge coupling portion 101*b* is formed at the body portion 121.

* * * * *